(12) United States Patent
Shi et al.

(10) Patent No.: US 12,095,319 B2
(45) Date of Patent: Sep. 17, 2024

(54) MOTOR STATOR, DRIVE MOTOR, AND ELECTRIC VEHICLE

(71) Applicant: HUAWEI DIGITAL POWER TECHNOLOGIES CO., LTD., Shenzhen (CN)

(72) Inventors: Chaojie Shi, Dongguan (CN); Chaoqiang Wu, Dongguan (CN); Jinhua Chen, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 17 days.

(21) Appl. No.: 17/878,637

(22) Filed: Aug. 1, 2022

(65) Prior Publication Data
US 2022/0368201 A1 Nov. 17, 2022

(30) Foreign Application Priority Data
Aug. 2, 2021 (CN) .......................... 202110881623.4

(51) Int. Cl.
*H02K 21/04* (2006.01)
(52) U.S. Cl.
CPC ................................. *H02K 21/046* (2013.01)
(58) Field of Classification Search
CPC ........ H02K 1/17; H02K 1/182; H02K 21/046; H02K 21/24; H02K 2201/12; H02K 3/28; Y02T 10/06
See application file for complete search history.

(56) References Cited

U.S. PATENT DOCUMENTS

| 4,398,112 A * | 8/1983 | van Gils | H02K 3/04 |
| | | | 310/201 |
| 2015/0229173 A1 | 8/2015 | Sromin | |
| 2016/0344272 A1* | 11/2016 | Sarlioglu | H02K 21/44 |

FOREIGN PATENT DOCUMENTS

| CN | 103329410 A | 9/2013 |
| CN | 204391935 U | 6/2015 |
| CN | 105245073 B | 11/2017 |
| CN | 209046380 U | 6/2019 |
| CN | 111446797 A | 7/2020 |
| DE | 102014213506 A1 | 1/2016 |
| EP | 2869433 A1 | 5/2015 |
| JP | S60128838 A | 7/1985 |
| JP | 2004064914 A | 2/2004 |
| JP | 3745714 B2 | 2/2006 |

(Continued)

OTHER PUBLICATIONS

Office Action in Chinese Appln. No. 202110881623.4, dated May 9, 2023, 8 pages.

(Continued)

*Primary Examiner* — Naishadh N Desai
(74) *Attorney, Agent, or Firm* — Fish & Richardson P.C.

(57) ABSTRACT

The present disclosure describes a motor stator, in which a flux winding is bent into a wave shape, and may be divided into a plurality of first parts, a plurality of second parts, and a plurality of third parts based on winding positions on a stator core. In a process of embedding flux windings into stator slots on the stator core, the flux windings may be directly sunk into the stator slots one by one, so that the second part is embedded into the stator slot, the first part is located on an outer surface of the stator core, and the third part is located on an inner surface of the stator core.

20 Claims, 15 Drawing Sheets

(56) References Cited

FOREIGN PATENT DOCUMENTS

| | | | |
|---|---|---|---|
| JP | 2007329985 | A | 12/2007 |
| JP | 2008043043 | A | 2/2008 |
| JP | 2010172094 | A | 8/2010 |
| JP | 2014241712 | A | 12/2014 |
| JP | 2016005350 | A | 1/2016 |
| WO | 2012101630 | A1 | 8/2012 |

OTHER PUBLICATIONS

Extended European Search Report in European Appln No. 22188026.3, dated Dec. 21, 2022, 6 pages.
Office Action in Japanese Appln. No. 2022-122725, mailed on Aug. 29, 2023, 14 pages (with English translation).

* cited by examiner

MOTOR STATOR, DRIVE MOTOR, AND ELECTRIC VEHICLE

CROSS-REFERENCE TO RELATED APPLICATIONS

This application claims priority to Chinese Patent Application No. 202110881623.4, filed on Aug. 2, 2021. The disclosures of the aforementioned applications are hereby incorporated by reference in their entireties.

TECHNICAL FIELD

The present invention relates to the field of motor technologies, and in particular, to a motor stator, a drive motor, and an electric vehicle.

BACKGROUND

Compared with a conventional permanent magnet motor with a radial magnetic field, a permanent magnet motor with an axial magnetic field has significant advantages such as a compact structure, high torque density, and a small volume. In the conventional technology, because a structure and a process of the axial flux motor are immature, a large quantity of non-standard parts and machining processes exist, and assembly and tapeout of the motor are more difficult than those of the conventional radial flux motor. In addition, manufacturing costs of the axial flux motor are also increased, and competitiveness of the axial flux motor is reduced.

SUMMARY

To resolve the foregoing problem, embodiments of this application provide a motor stator, a drive motor, and an electric vehicle. A flux winding is bent into a specific shape to match a stator slot structure on an end face of a stator core, and flux windings may be directly sunk into stator slots one by one, so that it is quite easy to wind the flux windings on the stator core, thereby resolving a problem of difficult tapeout caused by a small volume of the motor stator.

In view of this, the following technical solutions are used in embodiments of this application.

According to a first aspect, this application provides a motor stator, including: a stator core, where the stator core includes a plurality of stator slots that penetrate an outer surface of the stator core and an inner surface of the stator core; and at least one flux winding, where the flux winding is nested in the plurality of stator slots, and is configured to generate an alternating flux when a current is applied. The flux winding includes a plurality of first parts, a plurality of second parts, and a plurality of third parts, and the plurality of first parts and the plurality of third parts are alternately arranged in sequence, and are connected by using the plurality of second parts. The first part is a part that is of the flux winding and that is located on the outer surface of the stator core, the second part is a part that is of the flux winding and that is embedded into the stator slot, and the third part is a part that is of the flux winding and that is located on the inner surface of the stator core.

In this implementation, the flux winding is bent into a wave shape, and may be divided into the plurality of first parts, the plurality of second parts, and the plurality of third parts based on winding positions on the stator core. In a process of embedding flux windings into the stator slots on the stator core, the flux windings may be directly sunk into the stator slots one by one, so that the second part is embedded into the stator slot, the first part is located on the outer surface of the stator core, and the third part is located on the inner surface of the stator core. It is quite easy to wind the flux windings on the stator core, so that a problem of difficult tapeout caused by a small volume of the motor stator is resolved.

In an implementation, the stator core includes a first end face and a second end face opposite to the first end face, and the plurality of stator slots are disposed on the first end face and/or the second end face.

In this implementation, stator slots are disposed on one or two end faces of the stator core, so that there is an opening on the end face of the stator slot, thereby helping subsequently embed the flux winding into the stator slots.

In an implementation, the stator slot includes a first surface, and the first surface is a surface that is of the stator slot and that is close to an adjacent stator slot. The motor stator further includes a plurality of permanent magnets, the permanent magnet is disposed on the first surface, and is configured to generate a permanent magnet flux, and a direction of the permanent magnet flux is perpendicular to a direction of an alternating flux generated by the flux winding.

In this implementation, a permanent magnet is disposed on a side edge of the stator slot, and the direction of the flux generated by the permanent magnet is perpendicular to the direction of the flux generated by the flux winding, so that the flux generated by the magnet can enhance the flux generated by the flux winding, thereby improving torque density of a drive motor.

In an implementation, every two of the plurality of permanent magnets are spaced apart by a same quantity of stator slots.

In this implementation, for stator slots on one end face, permanent magnets may be disposed in the stator slots at intervals of a specified quantity of stator slots, so that a quantity of permanent magnets in the entire motor stator can be reduced, thereby reducing costs of the motor and reducing a weight of the motor.

In an implementation, the direction of the permanent magnet flux is perpendicular to the first surface of the stator slot.

In this implementation, a direction of a magnetic field generated by the permanent magnet is perpendicular to the first surface of the stator slot, so that magnetic fields generated by two adjacent permanent magnets pass through a protrusion between two adjacent stator slots, so that the protrusion can have a magnetic convergence effect, thereby better improving torque density of the drive motor.

In an implementation, a shape of the flux winding is a wave shape.

In this implementation, each flux winding is bent into a wave shape, to conform to a structure on an end face of the stator core, so that the flux windings can be better sunk into the stator slots.

In an implementation, a cross-sectional shape of the flux winding is a flat shape or a shape of a plurality of circles, and a slot opening of the stator slot is greater than a half of a slot width of the stator slot.

In this implementation, if the flux winding is a one-turn coil, a cross section of the flux winding is usually of a relatively large flat shape. If the slot opening of the stator slot is relatively small, it is uneasy to embed the flux winding into the stator slot. For a multi-turn circular coil, a cross-sectional shape of the flux winding is formed by a plurality of circles, and a shape of the flux winding is variable.

Therefore, for a stator slot with a relatively large slot opening, it is quite easy to embed the flux winding into the stator slot.

In an implementation, the cross-sectional shape of the flux winding is a shape of a plurality of circles, and the slot opening of the stator slot is less than or equal to a half of the slot width of the stator slot.

In this implementation, because a cross-sectional shape of a flux winding formed by a multi-turn circular coil may change, the slot opening of the stator slot is made as small as possible, to prevent a permanent magnet inside the stator slot from falling off because the slot opening is excessively large while ensuring that the flux winding can be embedded into the stator slot.

In an implementation, the plurality of stator slots are arranged on the first end face and/or the second end face at equal intervals.

In this implementation, a plurality of stator slots are arranged on each end face of the stator core at equal intervals, so that alternating fluxes generated after the flux windings are subsequently embedded are evenly distributed on the stator core.

In an implementation, a plurality of stator slots are disposed on each of the first end face and the second end face, and stator slots on the first end face and stator slots on the second end face are arranged in a paired mirror symmetric manner about a yoke part of the stator core.

In this implementation, positions of stator slots disposed on one end face of the stator core and positions of stator slots disposed on the other end face are arranged in a paired mirror symmetric manner, to avoid a reduction in effective alternating fluxes that is caused by misalignment of an alternating flux generated by a flux winding wound at one end and an alternating flux generated by a flux winding at the other end.

In an implementation, the plurality of stator slots are disposed on each of the first end face and the second end face, one of two adjacent second parts of the flux winding is embedded into the stator slot on the first end face, and the other one of the two adjacent second parts of the flux winding is embedded into the stator slot on the second end face.

In an implementation, one of the two adjacent second parts of the flux winding is embedded into a first stator slot on the first end face, the other one of the two adjacent second parts of the flux winding is embedded into a second stator slot on the second end face, and the first stator slot and the second stator slot are arranged in a mirror symmetric manner about the yoke part of the stator core.

In an implementation, the flux winding includes at least one turn of coil.

In this implementation, a multi-turn coil constitutes one flux winding, so that operation complexity is reduced in a cabling process of the stator core. In addition, in the flux winding including the multi-turn coil, for each pole-phase group, only two winding terminals need to be connected, and only one winding/tapeout process is required. This effectively reduces a quantity of welding points and winding/tapeout processes, improves reliability of a connection of the flux winding and manufacturing efficiency, and reduces manufacturing costs.

According to a second aspect, this application provides a drive motor, including one rotating shaft, at least one motor rotor, and at least one motor stator in the possible implementations of the first aspect. The at least one motor rotor and the at least one motor stator are alternately disposed, and are nested on the rotating shaft.

According to a third aspect, this application provides an electric vehicle, including at least one drive motor in the possible implementations of the first aspect.

BRIEF DESCRIPTION OF DRAWINGS

The following briefly describes accompanying drawings used for describing embodiments or the conventional technology.

DESCRIPTION OF EMBODIMENTS

The following describes technical solutions in embodiments of this application with reference to accompanying drawings in the embodiments of this application.

In the descriptions of this application, directional or position relationships indicated by the terms "center", "up", "down", "front", "rear", "left", "right", "vertical", "horizontal", "top", "bottom", "inside", "outside", and the like are based on the directional or position relationships shown in the accompanying drawings, and are merely intended to describe this application and simplify the descriptions, but are not intended to indicate or imply that an apparatus or an element shall have a specific direction or be formed and operated in a specific direction, and therefore shall not be understood as a limitation on this application.

In the descriptions of this application, it should be noted that unless otherwise specified and limited explicitly, the terms "installation", "joint", and "connection" shall be understood in a broad sense, for example, may be fastening, a detachable connection, abutting, or an integrated connection. Persons of ordinary skill in the art may understand specific meanings of the terms in this application based on specific situations.

In the descriptions of this specification, the described specific features, structures, materials, or characteristics may be combined in a proper manner in any one or more of embodiments or examples.

Figure 1:
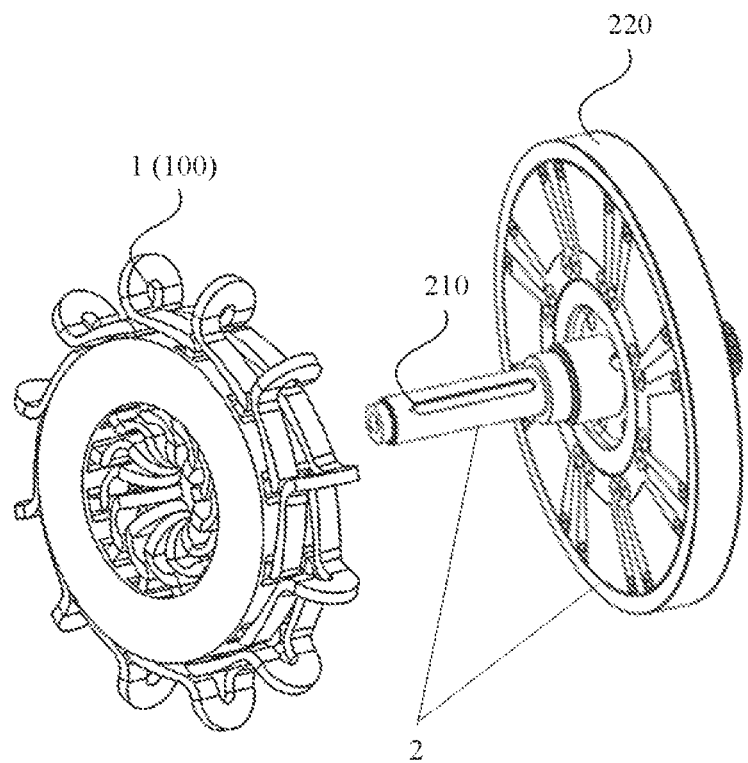
FIG. 1 is a schematic diagram of a structure of a drive motor according to an embodiment of this application.

FIG. 1 is a schematic diagram of a structure of a drive motor according to an embodiment of this application. As shown in FIG. 1, the drive motor includes a stator part 1 and a rotor part 2. The stator part 1 includes one motor stator 100, and the rotor part 2 includes one rotating shaft 210 and one motor rotor 220. The motor rotor 220 is nested on and fastened to the rotating shaft 210. The motor stator 100 is nested on the rotating shaft 210, and the motor stator 100 and the motor rotor 220 are stacked together.

When a current is applied to a flux winding in the motor stator 100, an alternating flux generated in an axial direction of the motor stator 100 interacts with a permanent magnet flux generated by the motor rotor 220, so that the motor rotor 220 rotates relative to the motor stator 100, and drives the rotating shaft 210 to rotate, and therefore the drive motor rotates.

FIG. 1 of this application uses only one motor stator 100 and one motor rotor 220 as an example, and does not indicate that the technical solutions of this application are limited to the solution of FIG. 1. For persons skilled in the art, a quantity of motor stators 100 and a quantity of motor rotors 220 on one drive motor are not limited, and there may be any quantity of motor stators 100 and any quantity of motor rotors 220.

A motor stator claimed in the technical solutions of this application includes a stator core, at least one flux winding, and a plurality of magnets. At least two stator slots are disposed on one end face of the stator core, or at least two stator slots are disposed on each end face of the stator core, to nest the flux winding. "Two end faces" mentioned herein are the foregoing first end face and the foregoing second end face opposite to the first end face, namely, surfaces of the stator core that are perpendicular to a rotating shaft. The flux winding is bent into a wave shape, and may be divided into a plurality of first parts, a plurality of second parts, and a plurality of third parts based on winding positions on the stator core. The plurality of first parts and the plurality of third parts are alternately arranged in sequence, and are connected by using the plurality of second parts. The first part is a part that is of the flux winding and that is located on an outer surface of the stator core, the second part is a part that is of the flux winding and that is located in the stator slot, and the third part is a part that is of the flux winding and that is located on an inner surface of the stator core.

In terms of a single winding, each tooth-wound winding and an adjacent tooth-wound winding are alternately connected by using an inner end and an outer end of an axial flux motor, thereby forming a wave-shaped connection manner. "Tooth" mentioned herein refers to a "tooth part" on the stator core, namely, a convex part between two adjacent stator slots on the stator core. The "tooth part" corresponds to a "yoke part", namely, a part other than the convex part in the stator core.

In a process of embedding flux windings into the stator slots on the stator core, the flux windings may be directly sunk into the stator slots one by one, so that the second part is embedded into the stator slot, the first part is located on the outer surface of the stator core, and the third part is located on the inner surface of the stator core. It is quite easy to wind the flux windings on the stator core, so that a problem of difficult tapeout caused by a small volume of the motor stator is resolved.

To improve torque density of a drive motor, in embodiments of this application, magnets are separately disposed on two side edges of the stator slots, and a direction of a flux generated by the magnet is perpendicular to a direction of a flux generated by the flux winding, so that the flux generated by the magnet can enhance the flux generated by the flux winding, thereby improving the torque density of the drive motor.

The following describes the solutions of this application by using a 4-pole 12-slot permanent magnet motor with an axial magnetic field as an example.

Figure 2:
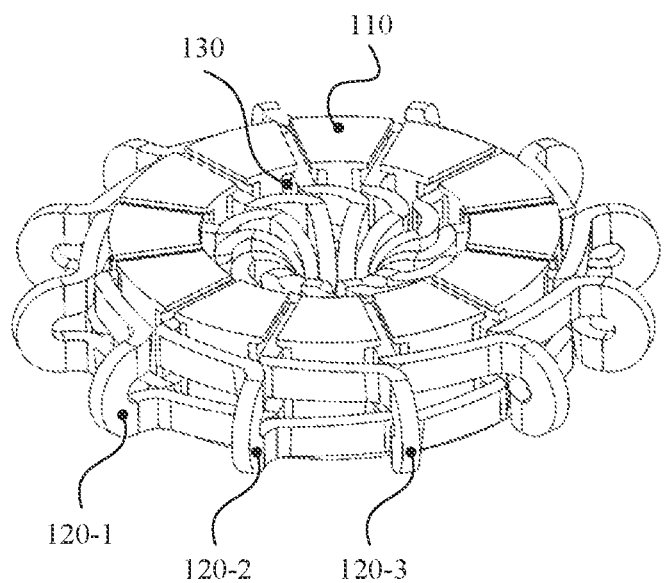
FIG. 2 is a schematic diagram of a structure of a motor stator according to an embodiment of this application.
Figure 3:
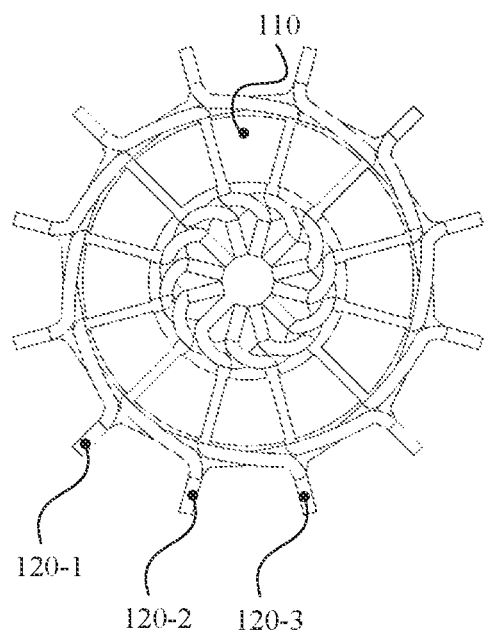
FIG. 3 is a schematic diagram of a top-view structure of a motor stator according to an embodiment of this application.

FIG. 2 and FIG. 3 show a motor stator 100. The motor stator 100 includes a stator core 110, a plurality of flux windings 120, and a plurality of permanent magnets 130. Structures and mutual coupling manners of the three components are specifically as follows:

The stator core 110 is usually a ring-shaped structure formed by stamping and winding a silicon steel material, or may be a ring-shaped structure formed by directly machining or splicing materials such as a composite soft magnetic component (SMC). Both an inner surface and an outer surface of the stator core 110 are cylindrical. The inner surface of the stator core 110 is a surface facing a rotating shaft 210, and the outer surface of the stator core 110 is a surface opposite to the inner surface. 12 stator slots are disposed on one end face of the stator core 110, and 12 stator slots may be disposed on the other end face, or no stator slot may be disposed on the other end face. In this application, stator slots are disposed on one or two end faces of the stator core, so that the flux winding 120 can be embedded into the stator slot and wound on the stator core 110. Optionally, the stator slot may be disposed in the middle of the stator core 110, in other words, a hole is punctured on the outer surface of the stator core 110, and penetrates into the inner surface of the stator core 110, so that the stator slot is formed.

Figure 4:
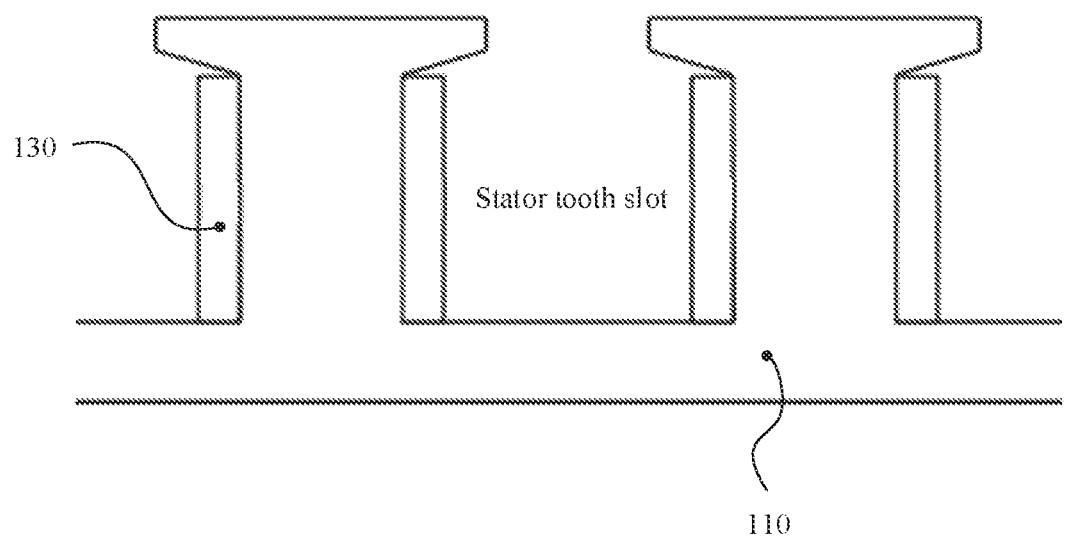
FIG. 4 is a schematic diagram of a partial side-view structure of a stator core according to an embodiment of this application.

For example, as shown in FIG. 4, stator slots are disposed on one end face of the stator core 110. The 12 stator slots are arranged on one end face of the stator core 110 at equal intervals, one end of each stator slot is connected to the inner surface of the stator core 110, and the other end of each stator slot is connected to the outer surface of the stator core 110, so that the flux winding 120 can penetrate into an inner side of the stator core 110 from an outer side of the stator core 110. In this way, the flux windings 120 are wound on the stator core 110, and can generate alternating fluxes with a plurality of poles and phases when a current is applied.

Preferably, if stator slots are disposed on one end face of the stator core 110, the stator core 110 may be designed to include a first core part and a second core part. Both the first core part and the second core part are ring-shaped silicon steel, and a radius of an inner surface of the first core part is equal to a radius of an outer surface of the second core part, so that the first core part can be nested on the outer surface of the second core part and located at an end that is of the second core part and at which there is no stator slot. Therefore, a radius of an outer surface of the end face that is of the formed stator core 110 and on which the stator slots are disposed is smaller, and a radius of an outer surface of an end face on which no stator slot is disposed is larger, so that the following case is avoided: When the flux winding 120 is embedded into the stator slot, a part of the flux winding 120 is wound on the outer surface of the stator core 110 to increase a radius of an outer surface of the motor stator 100.

Figure 5:
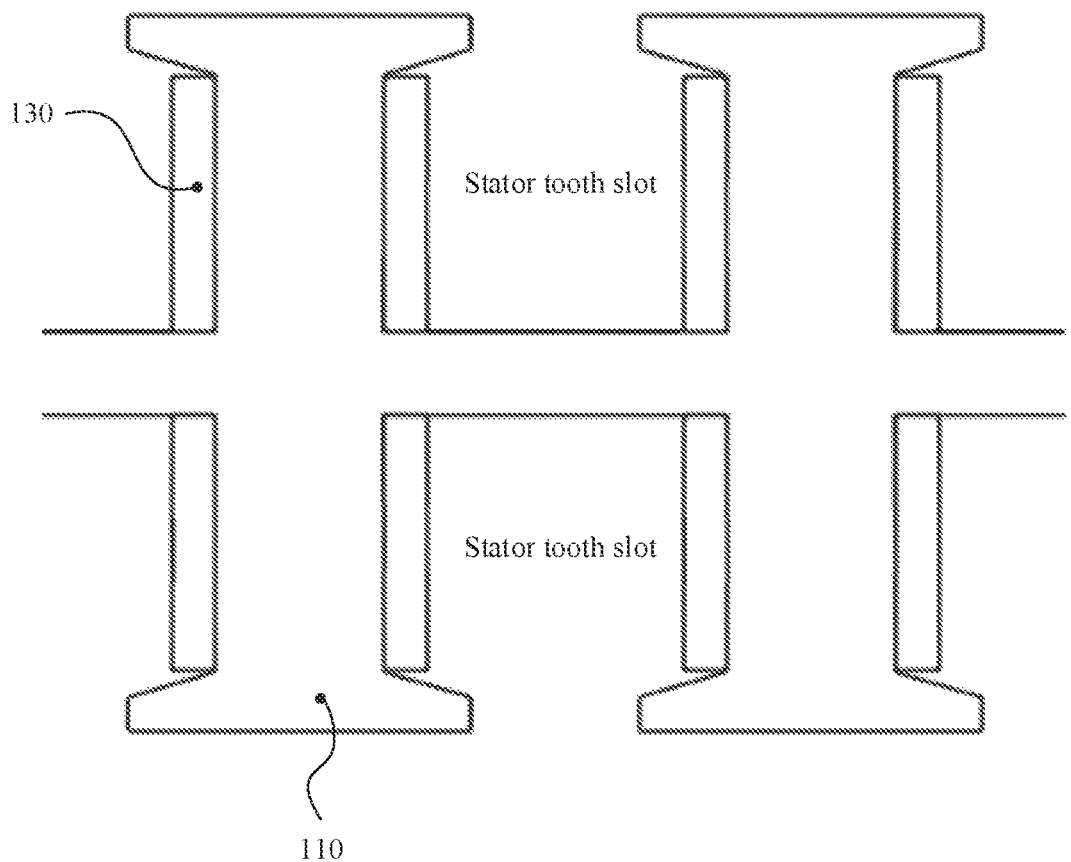
FIG. 5 is a schematic diagram of a partial side-view structure of a stator core according to an embodiment of this application.

For example, as shown in FIG. 5, stator slots are disposed on two end faces of the stator core 110. 12 stator slots on each end face are arranged on the end face of the stator core 110 at equal intervals, and the inner surface of the stator core 110 is connected to the outer surface of the stator core 110 by using the stator slots, so that the flux winding 120 can penetrate into an inner side of the stator core 110 from an outer side of the stator core 110. In this way, the flux windings 120 are wound on the stator core 110, and can generate alternating fluxes with a plurality of poles and phases when a current is applied.

Preferably, positions of stator slots disposed on one end face of the stator core 110 and positions of stator slots disposed on the other end face are arranged in a paired mirror symmetric manner about a yoke part of the stator core 110, to avoid a reduction in effective alternating fluxes that is caused by misalignment of an alternating flux generated by a flux winding 120 wound at one end and an alternating flux generated by a flux winding 120 at the other end.

In this application, a shape of the stator slot, namely, a cross section that is of the stator core 110 and that is perpendicular to a radial direction, may be a regular shape such as a rectangle, a trapezoid, or a circle, or may be an irregular shape, provided that the flux winding 120 and the permanent magnet 130 can be disposed in the stator slot. This is not limited herein in this application. Preferably, as shown in FIG. 4 and FIG. 5, the shape of the stator slot is similar to a "wine bottle", the shape is narrower near the end face of the stator core 110, in other words, a slot opening of the stator slot is narrower, and the shape is wider at a position away from the end face of the stator core 110, in other words, a slot width of the stator slot is wider. The shape of the stator slot designed in this application is narrower near the end face of the stator core 110, to prevent the permanent magnet 130 from falling off in an axial direction of the stator core 110 when the permanent magnet 130 is subsequently embedded into the stator slot.

A ratio relationship between the slot opening and the slot width of the stator slot is related to a cross-sectional shape of the embedded flux winding 120. Details are described as follows:

When the cross-sectional shape of the flux winding 120 is any variable shape formed by a relatively small multi-turn coil, a ratio of the opening to the slot width of the stator slot is relatively small. While it is ensured that the flux winding 120 can be embedded into the stator slot, a smaller slot opening better prevents the permanent magnet 130 from falling off in the axial direction of the stator core 110. Preferably, the ratio of the slot opening to the slot width is less than or equal to ½.

When the cross-sectional shape of the flux winding 120 is a flat shape or is another fixed shape with a relatively large cross-sectional area, a ratio of the opening and the slot width of the stator slot is relatively large, so that the flux winding 120 can be embedded into the stator slot. Preferably, the ratio of the slot opening to the slot width is greater than ½. Optionally, if the ratio of the opening to the slot width of the stator slot is relatively large, the flux winding 120 of any variable shape formed by a relatively small multi-turn coil can also be embedded into the stator slot. The flux winding 120 is usually a coil obtained by bending, into a specific shape, a metal wire whose outer surface is wrapped with an insulation layer, and the flux winding 120 bent into the specific shape may be embedded into some stator slots on the stator core 110 and wound on a tooth part between two stator slots. Each flux winding includes a multi-turn coil.

For ease of subsequent description, the flux winding 120 may be divided into at least one part 121, at least one second part 122, and at least one third part 123 based on different surfaces on which the parts are located on the stator core 110 after the flux winding 120 is embedded into the stator slot. Each first part 121 is connected to the third part 123 by using the second part 122. The first part 121 is a part that is of the flux winding 120 and that is located on the outer surface of the stator core 110, the second part 122 is a part that is of the flux winding 120 and that is embedded into the stator slot, and the third part 123 is a part that is of the flux winding 120 and that is located on the inner surface of the stator core 110.

Figure 6:
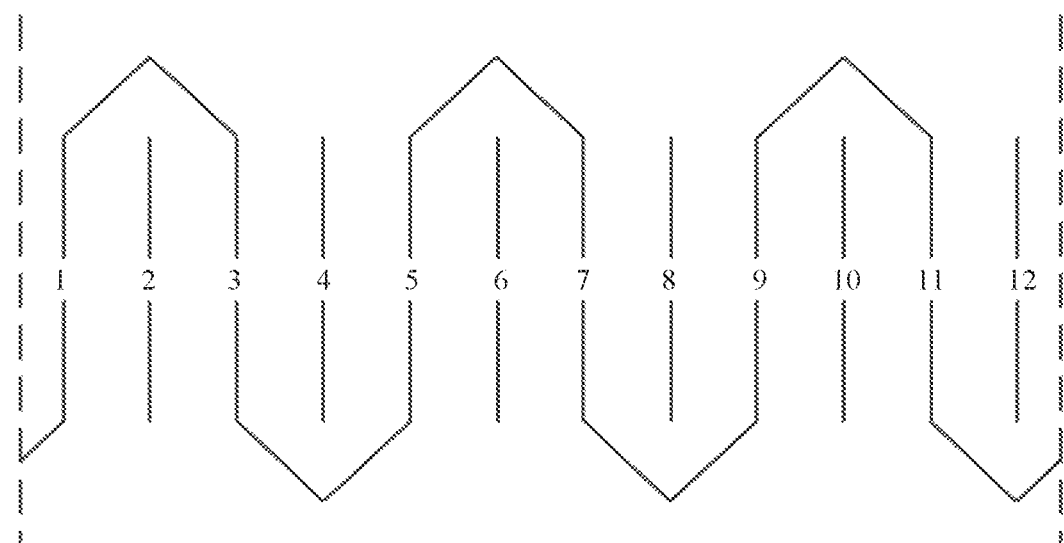
FIG. 6 is a schematic diagram in which a flux winding is bent according to an embodiment of this application.

In this application, the flux winding 120 may be bent into a wave shape shown in FIG. 6, so that when the flux winding 120 is embedded into the stator slot, each second part 122 of the flux winding 120 is embedded into the stator slot, each first part 121 is located on the outer surface of the stator core 110, and each third part 123 is located on the inner surface of the stator core 110.

Figure 7:
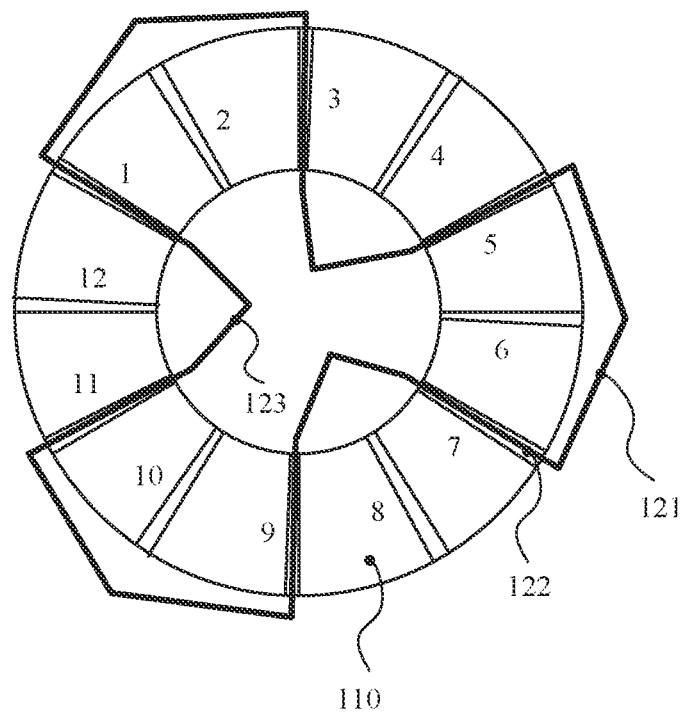
FIG. 7 is a schematic diagram in which a flux winding is wound on a stator core according to an embodiment of this application.

The stator core 110 shown in FIG. 4 is used as an example. 12 stator slots are disposed on one end face of the stator core 110. When one flux winding 120 is wound on the stator core, each second part 122 is embedded into the stator slot, and every two second parts 122 are spaced apart by one stator slot. Each first part 121 is located on an outer surface that is of the stator core 110 and that is between three consecutive stator slots, and every two first parts 121 are spaced apart by one stator slot. Each third part 123 is located on an inner surface that is of the stator core 110 and that is between three consecutive stator slots, and every two third parts 123 are spaced apart by one stator slot. A winding effect is shown in FIG. 7. The second parts 122 are separately embedded into a stator slot 1, a stator slot 3, a stator slot 5, a stator slot 7, a stator slot 9, and a stator slot 11.

For the stator core shown in FIG. 4, two flux windings 120 are wound on the stator core 110. One flux winding 120 is wound in the manner shown in FIG. 7. A bent shape of the other flux winding 120 is the same as a shape of a flux winding 120 in FIG. 7, and after the flux winding 120 is wound on the stator core 110, second parts 122 are separately embedded into a stator slot 2, a stator slot 4, a stator slot 6, a stator slot 8, a stator slot 10, and a stator slot 12.

Figure 8:
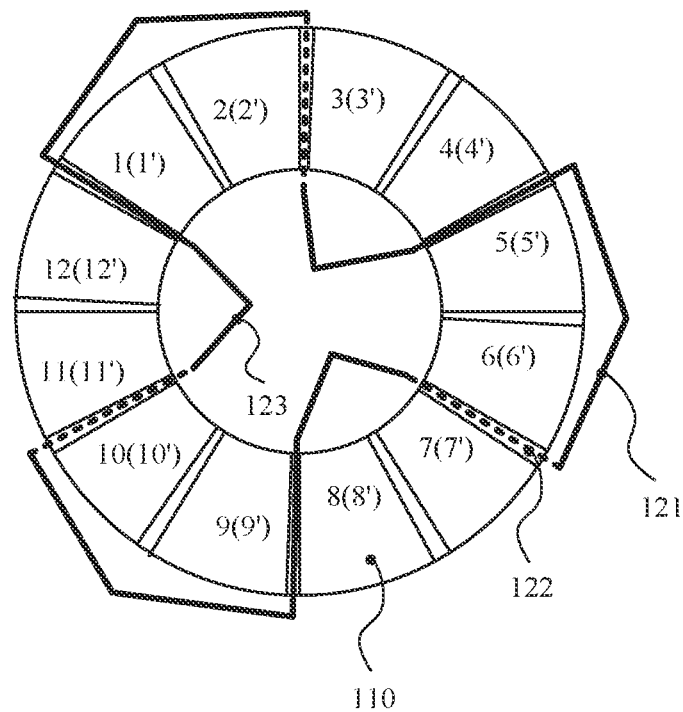
FIG. 8 is another schematic diagram in which a flux winding is wound on a stator core according to an embodiment of this application.

The stator core 110 shown in FIG. 5 is used as an example. 12 stator slots are disposed on two end faces of the stator core 110. When one flux winding 120 is wound on the stator core, each second part 122 is embedded into the stator slot, every two second parts 122 are spaced apart by one stator slot, one of two adjacent second parts 122 is located on a stator slot on one end face of the stator core 110, and the other one of the two adjacent second parts 122 is located on a stator slot on the other end face of the stator core 110. Each first part 121 is located on an outer surface that is of the stator core 110 and that is between three consecutive stator slots, every two first parts 121 are spaced apart by one stator slot, one end of the first part 121 is connected to a second part 122 embedded into a stator slot on one end face of the stator core 110, and the other end is connected to a second part 122 embedded into a stator slot on the other end face of the stator core 110. Each third part 123 is located on an inner surface that is of the stator core 110 and that is between three consecutive stator slots, every two third parts 123 are spaced apart by one stator slot, one end of the third part 123 is connected to a second part 122 embedded into a stator slot on one end face of the stator core 110, and the other end is connected to a second part 122 embedded into a stator slot on the other end face of the stator core 110. A winding effect is shown in FIG. 8.

Stator slots on one end face of the stator core 110 are a stator slot 1, a stator slot 2, a stator slot 3, a stator slot 4, a stator slot 5, a stator slot 6, a stator slot 7, and a stator slot 8, and stator slots on the other end face of the stator core 110 are a stator slot 1', a stator slot 2', a stator slot 3', a stator slot 4', a stator slot 5', a stator slot 6', a stator slot 7', and a stator slot 8'. Therefore, second parts 122 of a flux winding 120 in FIG. 8 are separately embedded into the stator slot 1, the stator slot 3', the stator slot 5, the stator slot 7', a stator slot 9, and a stator slot 11'.

For the stator core shown in FIG. 5, three flux windings 120 are wound on the stator core 110. One flux winding 120 is wound in the manner shown in FIG. 8. Bent shapes of the other two flux windings 120 are the same as a shape of a flux winding 120 in FIG. 8, and after the flux windings are wound on the stator core 110, second parts 122 of one flux winding 120 are separately embedded into the stator slot 2, the stator slot 4', the stator slot 6, the stator slot 8', a stator slot 10, and a stator slot 12', and second parts 122 of the other flux winding 120 are separately embedded into the stator slot 3, the stator slot 5' the stator slot 7, a stator slot 9', a stator slot 11, and the stator slot 1'.

In this application, a metal material selected for the flux winding 120 is usually copper, aluminum, or the like. An insulation material such as insulation paint, insulation paper, or a rubber is wrapped on an outer layer of the metal material. This is not limited herein in this application. In addition, a cross-sectional shape of the flux winding may be a rectangle (namely, a flat-cable winding) shown in FIG. 2, or may be any shape such as a circle (namely, a round-cable winding) or an ellipse. This is not limited herein in this application.

In the conventional technology, a flux winding of a discontinuous wave winding structure is used. For a flux winding taped out to a stator slot, each coil has two terminals that need to be welded, and each coil may include n coils in one pole-phase group. In this case, one flux winding has 2n welding points, and n corresponding winding/tapeout processes are required. Because of an excessive quantity of welding points, a few welding points are prone to be poorly welded, causing a reduction in reliability of a motor. Excessive winding/tapeout processes also reduce manufacturing efficiency and increase manufacturing costs. However, in this application, a flux winding of a continuous wave winding structure is used. For each pole-phase group, only two winding terminals need to be connected, and only one winding/tapeout process is required. This effectively reduces a quantity of welding points and winding/tapeout processes, improves reliability of a connection of the flux winding and manufacturing efficiency, and reduces manufacturing costs.

In the motor stator in this embodiment of this application, at least two stator slots are disposed on one end face of the stator core, or at least two stator slots are disposed on each end face of the stator core. A plurality of flux windings are used, and the plurality of flux windings are bent into a wave shape. In a process of embedding the flux windings into the stator slots on the stator core, the flux windings may be directly sunk into the stator slots one by one, and it is quite easy to wind the flux windings on the stator core, so that a problem of difficult tapeout caused by a small volume of the motor stator is resolved.

To improve the torque density of the drive motor, the motor stator 100 designed in this application further includes a plurality of permanent magnets 130. The plurality of permanent magnets 130 are separately disposed in stator slots on the stator core 110, and the permanent magnet is located on a surface of one side that is of each stator slot and that is close to an adjacent stator slot, namely, a first surface, to generate a flux to enhance an alternating flux generated by the flux winding 120 when a current is applied.

The permanent magnets 130 may also be located in some stator slots. For example, some stator slots are selected based on a quantity of stator slots on one end face of the stator core 110 and an interval ratio. Every two selected stator slots are spaced apart by N stator slots. Then the permanent magnets 130 are disposed on first surfaces of the selected stator slots. The permanent magnets 130 are evenly disposed in the stator core, so that alternating fluxes generated on the motor stator are evenly distributed. In addition, permanent magnets 130 are reduced, so that costs of the motor can be reduced, and a weight of the motor can also be reduced. N is an integer greater than or equal to zero.

Optionally, permanent magnets 130 disposed in each stator slot are not limited to two permanent magnets shown in FIG. 4, and one permanent magnet 130 may be disposed in each stator slot. The permanent magnets 130 are disposed at a same position in the stator slots, in other words, are located on first surfaces on a same side of the stator slots, specifically, a first surface on a left side or a first surface on a right side, so that there is a same distance between every two adjacent permanent magnets 130, and permanent magnet fluxes of adjacent permanent magnets 130 are the same, thereby implementing even distribution of alternating fluxes generated on the motor stator.

Figure 9:
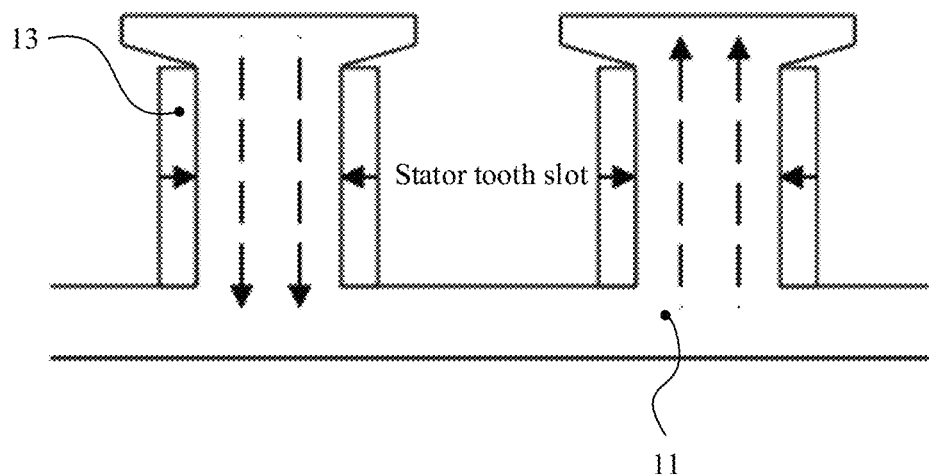
FIG. 9 is a schematic diagram of directions of fluxes generated by a magnet and a flux winding according to an embodiment of this application.

For example, stator slots are disposed on one end face of the stator core 110 shown in FIG. 4. As shown in FIG. 9, when a current is applied to the flux winding 120, a flux perpendicular to an end face of the stator core 110 is generated on the stator core 110. Because the current input to the flux winding 120 is usually an alternating current, a direction of the generated alternating flux is perpendicular to a first end face of the stator core 110 and facing downward, or is perpendicular to a first end face of the stator core 110 and facing upward.

To enhance the alternating flux generated by the flux winding 120, a direction of a flux generated by the permanent magnet 130 embedded into the stator slot is perpendicular to the direction of the alternating flux generated by the flux winding 120, so that when the alternating flux generated by the flux winding 120 changes in a direction perpendicular to an end face of the stator core 110, the flux generated by the permanent magnet 130 enters, in the direction of the flux generated by the flux winding 120, a flux loop generated by the flux winding 120, thereby enhancing the flux generated by the flux winding 120.

A material of the permanent magnet 130 may be a hard magnetic material, for example, neodymium iron boron, samarium cobalt, ferrite, or samarium iron nitrogen, that remains magnetic after an external magnetic field is removed. However, in practice, a temperature on a side of the motor stator 100 is relatively high, and a high-performance permanent magnet is relatively costly. Therefore, in this application, a cheap ferrite material whose coercivity has a positive temperature coefficient (that is, a cheap ferrite material that is less prone to be demagnetized at a higher temperature) is usually preferred, to improve torque density of a permanent magnet motor with an axial magnetic field at low costs.

In this application, the torque density of the drive motor may be:

$$\frac{T}{V_r} = KB_g A,$$

where

K represents a coefficient related to a size of the motor and a flux winding form. $B_g$ represents average flux density in air gap (namely, magnetic loading), T represents torque, and A represents electrical load.

Figure 10:
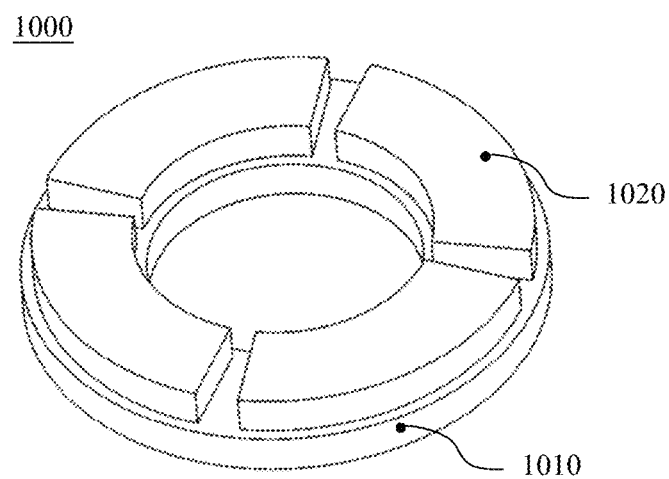
FIG. 10 is a schematic diagram of a structure of a permanent magnet rotor according to an embodiment of this application.

For the motor stator 100 designed in this application, a structure of a motor rotor 220 used in combination with the motor stator 100 may be any type of motor rotor. Examples are as follows:

The motor rotor 220 may be a permanent magnet rotor 1000 shown in FIG. 10. The permanent magnet rotor 1000 includes a rotor core 1010 and a plurality of permanent magnets 1020. The plurality of permanent magnets 1020 are attached to one end face of the rotor core 1010 at equal intervals, so that the permanent magnet rotor 1000 is coupled to the motor stator 100 in the manner shown in FIG. 1. In addition, an alternating flux generated after a current is applied to the motor stator 100 interacts with a permanent magnet flux generated on the permanent magnet rotor 1000, to drive the rotating shaft 210 to rotate.

Figure 11:
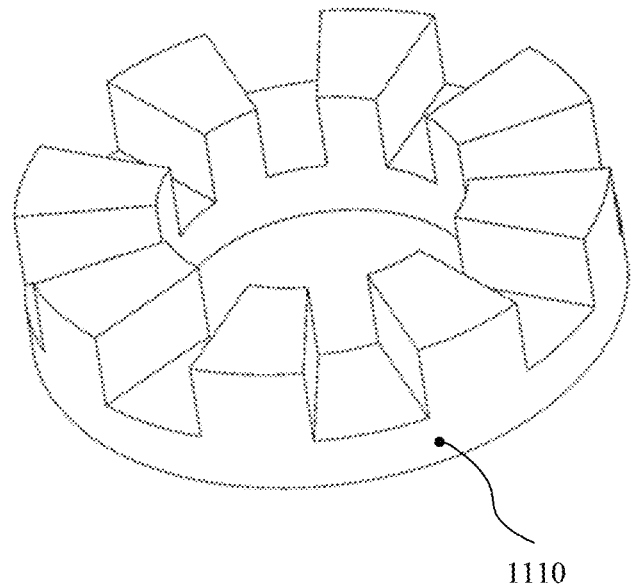
FIG. 11 is a schematic diagram of a structure of a reluctance rotor according to an embodiment of this application.

The motor rotor 220 may be a reluctance rotor 1100 shown in FIG. 11. The reluctance rotor 1100 has only one rotor core 1110, and a plurality of rotor slots are disposed on one end face of the rotor core 1110, so that the reluctance rotor 1100 is coupled to the motor stator 100 in the manner shown in FIG. 1. In addition, for an alternating flux generated after a current is applied to the motor stator 100, because a plurality of rotor slots of a cogging structure are disposed on one end face, a changing magnetic resistance is generated on a changing surface, so that air-gap magnetic energy changes, and corresponding torque is generated, thereby driving the rotating shaft 210 to rotate.

Figure 12:
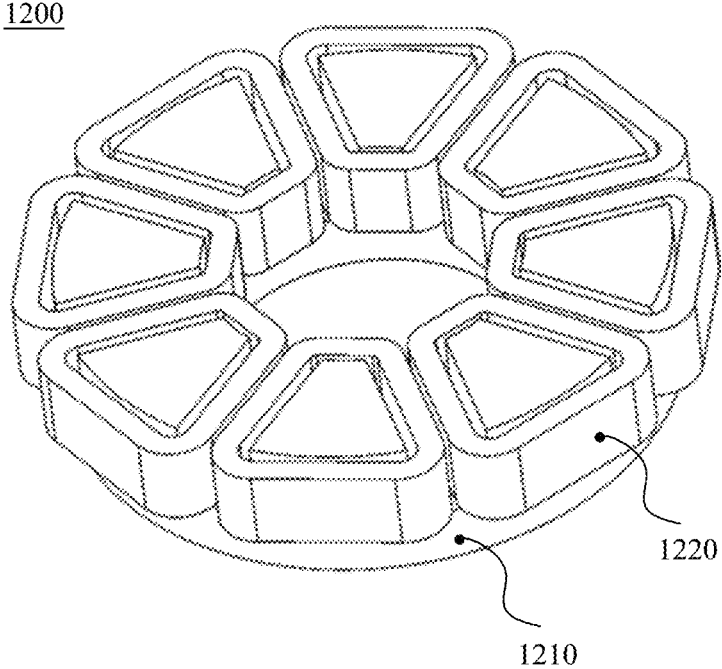
FIG. 12 is a schematic diagram of a structure of an electrically excited rotor according to an embodiment of this application.

The motor rotor 220 may be an electrically excited rotor 1200 shown in FIG. 12. The electrically excited rotor 1200 includes a rotor core 1210 and a plurality of excitation windings 1220. A plurality of rotor slots are disposed on one end face of the rotor core 1210 at equal intervals, so that protrusions are formed between rotor slots. The excitation winding 1220 is nested on the protrusion, so that the electrically excited rotor 1200 is coupled to the motor stator 100 in the manner shown in FIG. 1. In addition, after a current is applied to the electrically excited rotor 1200 and the motor stator 100, an excitation field generated by the electrically excited rotor 1200 interacts with an alternating flux generated by the motor stator 100, so that the electrically excited rotor 1200 rotates and drives the rotating shaft 210 to rotate.

Figure 13:
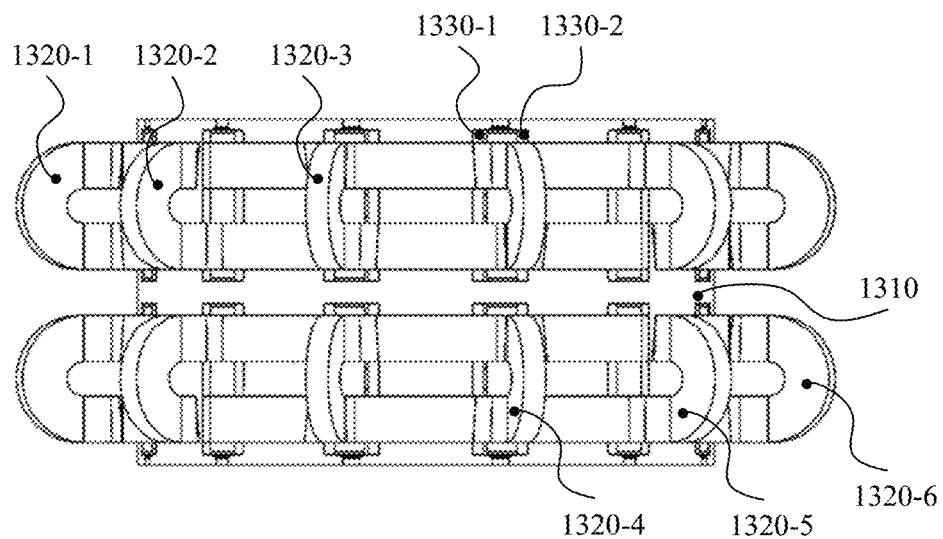
FIG. 13 is a schematic diagram of a cross-sectional structure of a drive motor according to an embodiment of this application.

To enhance the alternating flux generated by the motor stator, a motor stator 1300 shown in FIG. 13 is further designed in this application. The motor stator 1300 includes one stator core 1310, six flux windings (1320-1, . . . , and 1320-6), and a plurality of magnets (1330-1, 1330-2, . . . ). A structure of the stator core 1310 is similar to that of the stator core 110 shown in FIG. 5, and a slot of each stator slot of the stator core 1310 is deeper, so that a two-turn flux winding 1320 can be nested.

A bent shape of the flux winding 1320 is a wave shape, and is the same as that of the flux winding 120 shown in FIG. 6. The six flux windings 1320 may be classified into two groups, and each group includes three flux windings 1320. A winding manner is the same as that in FIG. 8. Details are not described herein again in this application.

The plurality of magnets 1330 are separately disposed in stator slots on the stator core 1310, and the magnet is located on a surface of one side that is of each stator slot and that is close to an adjacent stator slot, as in the disposing manner in FIG. 4 and FIG. 5, to generate a flux to enhance an alternating flux generated by the flux winding 1320 when a current is applied.

Figure 14:
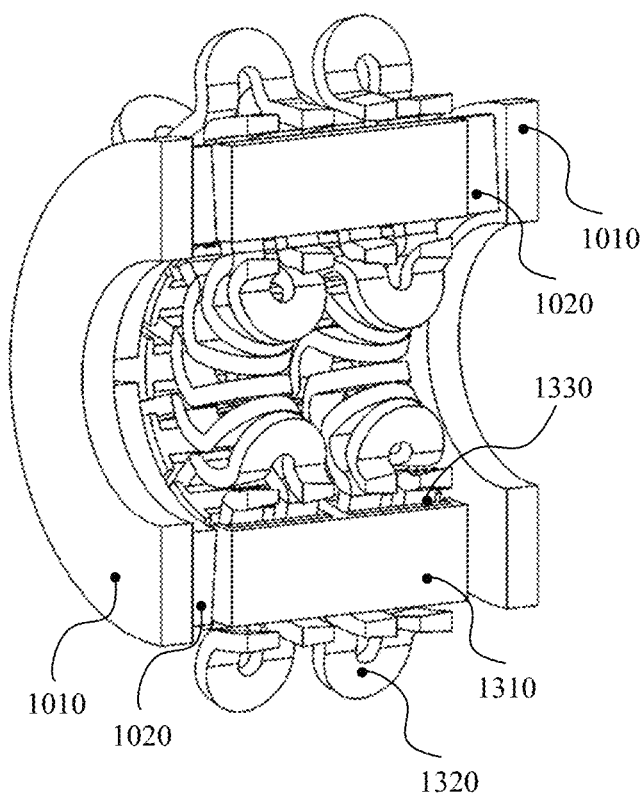
FIG. 14 is a schematic diagram of a side-view structure of a drive motor according to an embodiment of this application.

In this embodiment, the alternating flux generated by the motor stator 1300 shown in FIG. 13 is twice an alternating flux generated by the motor stator 100 shown in FIG. 5. When the motor stator 1300 is coupled to two motor rotors 220 in the manner shown in FIG. 1, a coupled structure is shown in FIG. 14 in an example in which the motor rotor 220 is the permanent magnet rotor 1000. If the motor stator 100 shown in FIG. 5 is used, to achieve an alternating flux generated by the motor stator 1300 in FIG. 14, two motor stators 100 shown in FIG. 5 need to be used, causing a larger volume of a formed drive motor.

In addition, in the structure of the motor stator 100 shown in FIG. 5, each flux winding 120 needs to be embedded into stator slots on two end faces of the stator core 110. In comparison, in the motor stator 1310 shown in FIG. 13, each flux winding 1320 only needs to be embedded into stator slots at one end, and therefore it is easier to wind the flux winding 1320 in the stator core, so that a tapeout difficulty in a processing process of the drive motor is further reduced.

In the foregoing embodiment, the 4-pole 12-slot permanent magnet motor with the axial magnetic field is used as an example to describe the solutions of this application. For persons skilled in the art, the solutions claimed in this application may be further applied to another type of permanent magnet motor with an axial magnetic field. The following describes an example of the another type of permanent magnet motor with the axial magnetic field.

Figure 15:
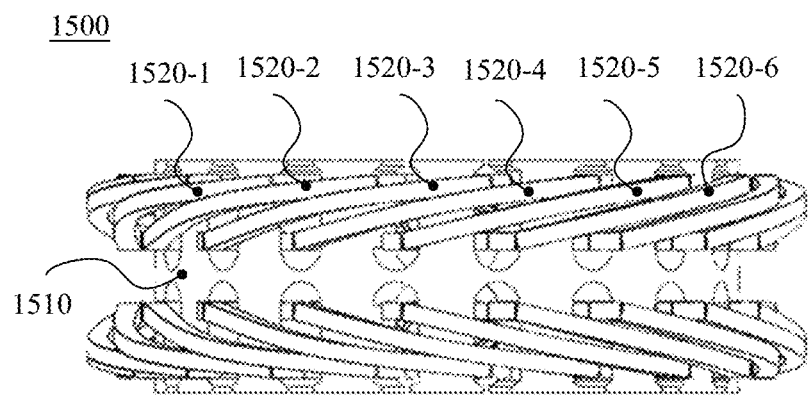
FIG. 15 is a schematic diagram of a side-view structure of a motor stator according to an embodiment of this application.

A 6-pole 18-slot permanent magnet motor with an axial magnetic field is used as an example. FIG. 15 shows a motor stator 1500. The motor stator 1500 includes one stator core 1510 and a plurality of flux windings 1520. 18 stator slots are disposed on each of two end faces of the stator core 1510 at equal intervals, and a one-turn or two-turn flux winding 1520 may be nested in each stator slot.

Figure 16:
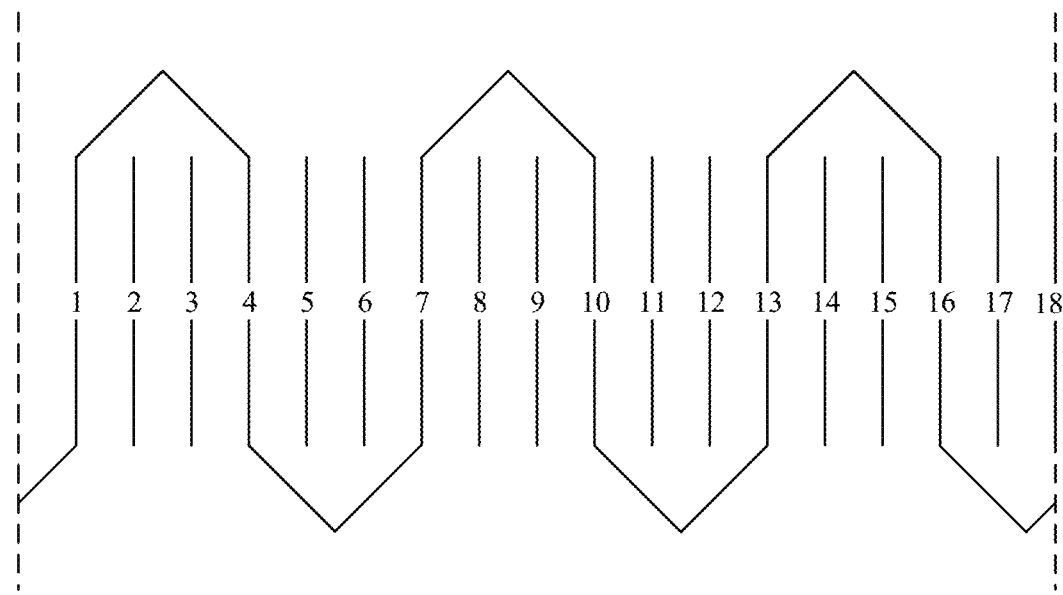
FIG. 16 is a schematic diagram in which a flux winding is bent according to an embodiment of this application.

The flux winding 1520 may be bent into a wave shape shown in FIG. 16, so that when the flux winding 1520 is embedded into the stator slot, a part (referred to as a "second part" below) of the flux winding 1520 is embedded into the stator slot, a part (referred to as a "first part" below) is located on an outer surface of the stator core 1510, and a part (referred to as a "third part" below) is located on an inner surface of the stator core 1510.

Figure 17:
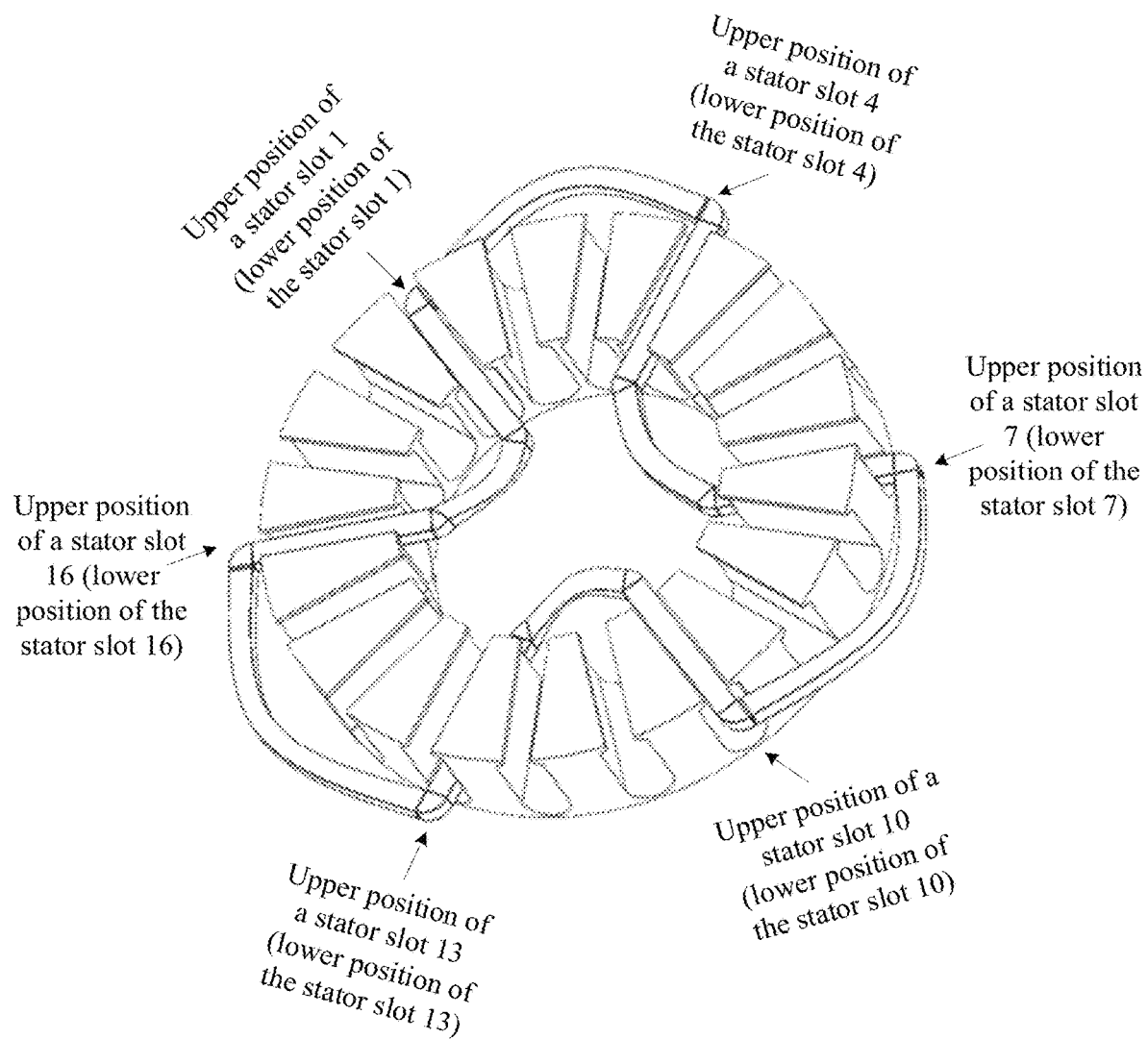
FIG. 17 is a schematic diagram of a winding manner when a two-turn flux winding is embedded into a stator slot according to an embodiment of this application.

If a two-turn flux winding 1520 can be nested in each stator slot, six flux windings 1520 are required on each end face of the stator core 1510. When one flux winding 1520 is wound on the stator core, each second part is embedded into the stator slot, every two second parts are spaced apart by two stator slots, one of two adjacent second parts is embedded into the bottom of the stator slot, and the other one of the two adjacent second parts is embedded into an outlet of the stator slot. Each first part is located on an outer surface that is of the stator core 1510 and that is between four consecutive stator slots, and every two first parts are spaced apart by two stator slots. Each third part is located on an inner surface that is of the stator core 1510 and that is between four consecutive stator slots, and every two third parts are spaced apart by two stator slots. A winding effect is shown in FIG. 17. The second parts are separately embedded into a lower position of a stator slot 1, an upper position of a stator slot 4, a lower position of a stator slot 7, an upper position of a stator slot 10, a lower position of a stator slot 13, and an upper position of a stator slot 16.

Second parts of the other five flux windings 1520 are wound in the following manner: Second parts of a flux winding 1520-2 are separately embedded into a lower position of a stator slot 2, an upper position of a stator slot 5, a lower position of a stator slot 8, an upper position of a stator slot 11, a lower position of a stator slot 14, and an upper position of a stator slot 17. Second parts of a flux winding 1520-3 are separately embedded into a lower position of a stator slot 3, an upper position of a stator slot 6, a lower position of a stator slot 9, an upper position of a stator slot 12, a lower position of a stator slot 15, and an upper position of a stator slot 18. Second parts of a flux winding 1520-4 are separately embedded into a lower position of the stator slot 4, an upper position of the stator slot 7, a lower position of the stator slot 10, an upper position of the stator slot 13, a lower position of the stator slot 16, and an upper position of the stator slot 1. Second parts of a flux winding 1520-5 are separately embedded into a lower position of the stator slot 5, an upper position of the stator slot 8, a lower position of the stator slot 11, an upper position of the stator slot 14, a lower position of the stator slot 17, and an upper position of the stator slot 2. Second parts of a flux winding 1520-6 are separately embedded into a lower position of the stator slot 6, an upper position of the stator slot 9, a lower position of the stator slot 12, an upper position of the stator slot 15, a lower position of the stator slot 18, and an upper position of the stator slot 3. A final effect of embedding the six flux windings 1520 is shown in FIG. 15.

Figure 18:
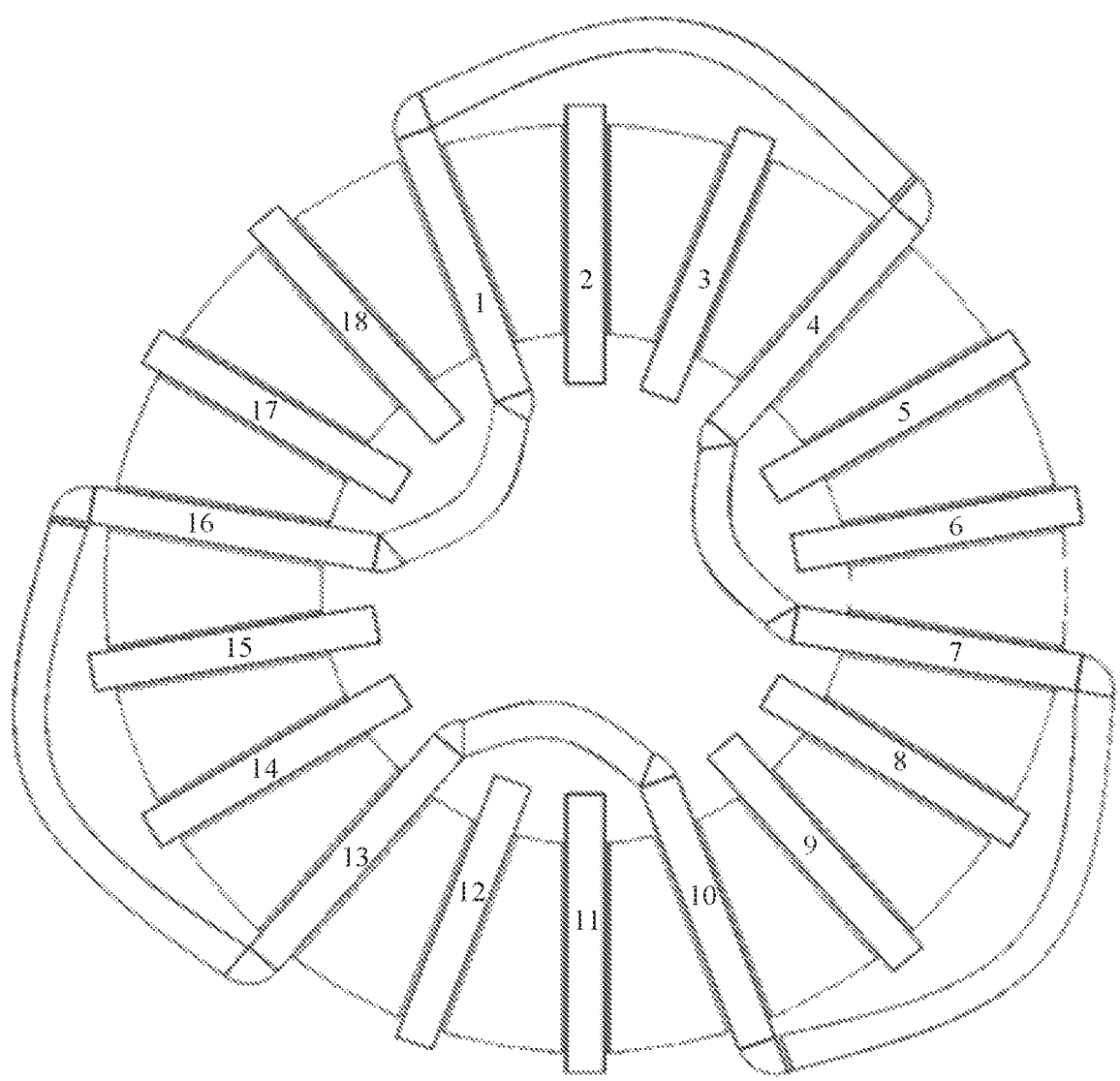
FIG. 18 is a schematic diagram of a winding manner when a one-turn flux winding is embedded into a stator slot according to an embodiment of this application.

If a one-turn flux winding 1520 can be nested in each stator slot, three flux windings 1520 are required on each end face of the stator core 1510. When one flux winding 1520 is wound on the stator core, each second part is embedded into the stator slot, and every two second parts are spaced apart by two stator slots. Each first part is located on an outer surface that is of the stator core 1510 and that is between four consecutive stator slots, and every two first parts are spaced apart by two stator slots. Each third part is located on an inner surface that is of the stator core 1510 and that is between four consecutive stator slots, and every two third parts are spaced apart by two stator slots. A winding effect is shown in FIG. 18. The second parts are separately embedded into a stator slot 1, a stator slot 4, a stator slot 7, a stator slot 10, a stator slot 13, and a stator slot 16.

Second parts of the other two flux windings 1520 are wound in the following manner: Second parts of a flux winding 1520-2 are separately embedded into a stator slot 2, a stator slot 5, a stator slot 8, a stator slot 11, a stator slot 14, and a stator slot 17. Second parts of a flux winding 1520-3 are separately embedded into a stator slot 3, a stator slot 6, a stator slot 9, a stator slot 12, a stator slot 15, and a stator slot 18. A final effect of embedding the six flux windings 1520 is shown in FIG. 19.

In this application, in the stator core 1510 of the motor stator 1500 shown in FIG. 15, stator slots are disposed on two end faces as an example, and stator slots may be alternatively disposed on one end face of the stator core 1510. If stator slots are disposed on one end face of the stator core 1510, the flux windings 1520 may still be embedded into the stator slots in the manner shown in FIG. 17 or FIG. 18.

In addition, a winding manner of the flux winding 1520 is not limited to the two manners shown in FIG. 17 and FIG. 18. The flux winding 1520 may be wound in the manner of alternating between stator slots on two end faces in FIG. 5. For details, refer to the manner shown in FIG. 5. This is not limited herein in this application.

Figure 19:
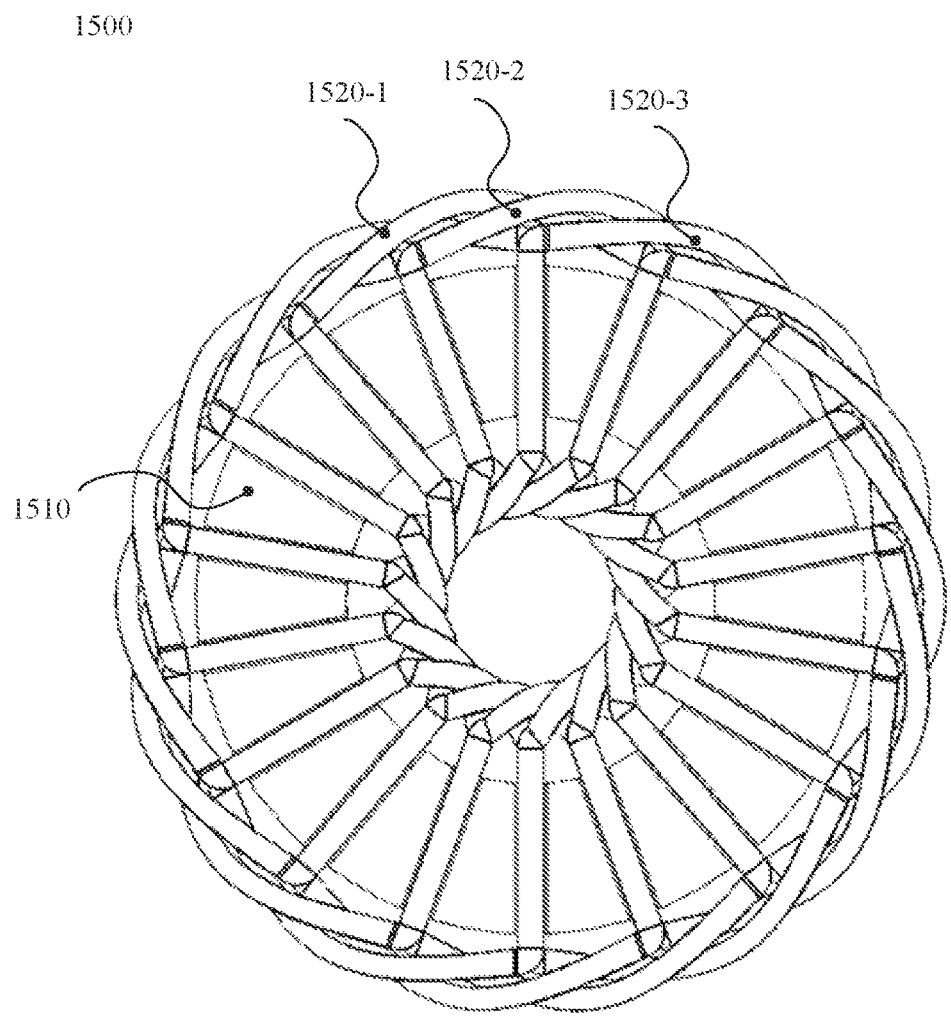
FIG. 19 is a schematic diagram of a structure of a wound stator core when a one-turn flux winding is embedded into a stator slot according to an embodiment of this application.
Figure 20:
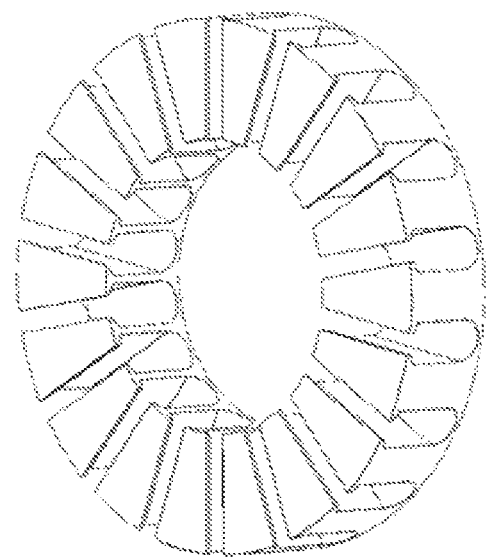
FIG. 20 is a schematic diagram of a shape of a stator slot on a stator core according to an embodiment of this application.
Figure 21:
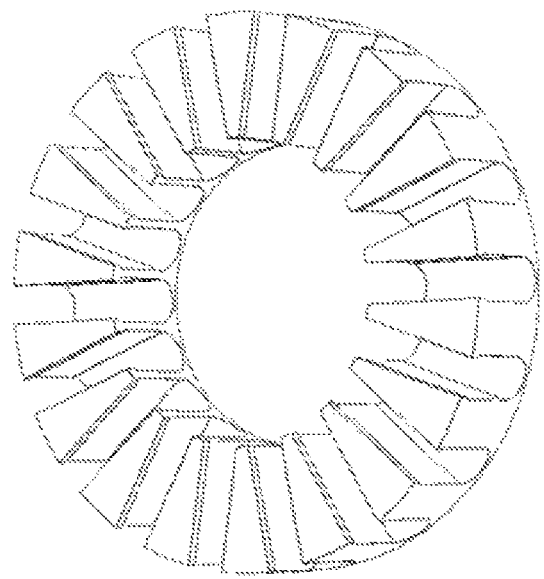
FIG. 21 is a schematic diagram of a shape of a stator slot on a stator core according to an embodiment of this application.

In this embodiment of this application, a shape of the stator slot may be a shape similar to a "wine bottle" shown in FIG. 19, or may be a shape similar to "U" shown in FIG. 20. This is not limited herein in this application.

To improve torque density of a drive motor, the motor stator 1500 designed in this application further includes a plurality of magnets 1530. A manner of disposing the plurality of magnets 1530 is the same as the manner of disposing the permanent magnets 130 in the motor stator 100 in the foregoing embodiment. For details, refer to the structures shown in FIG. 4 and FIG. 5. Details are not described herein again in this application.

Figure 22:
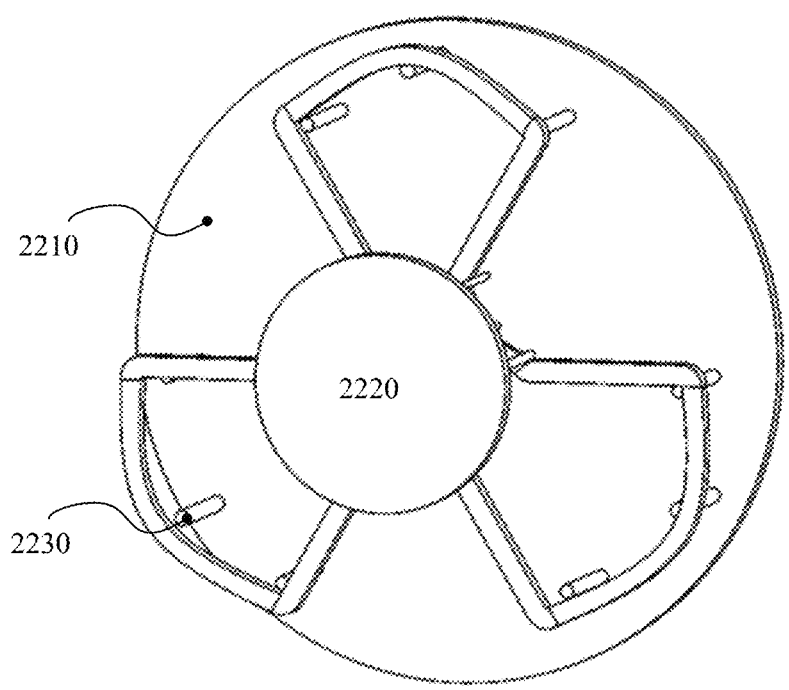
FIG. 22 is a schematic diagram of a winding device when the winding device presses a flux winding according to an embodiment of this application.
Figure 23:
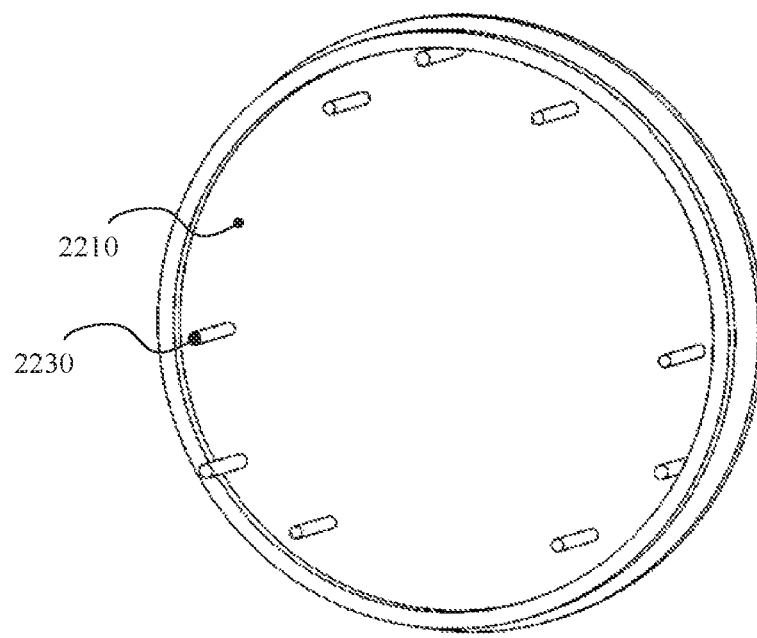
FIG. 23 is a schematic diagram of a structure of a base plate according to an embodiment of this application.

FIG. 22 shows a winding device 2200. The winding device 2200 includes a base plate 2210, a cover plate 2220, and a plurality of stoppers 2230. Structures of the three components are specifically as follows:

The base plate 2210 is usually of a disk-shaped structure. A plurality of recesses are disposed on a surface of one side of the base plate 2210, and are configured to nest and fasten the plurality of stoppers 2230. For example, as shown in FIG. 23, nine recesses (not shown in the figure and at positions into which the stoppers 2230 are embedded) are disposed on a surface of one side of the base plate 2210, and the nine recesses may be classified into three groups. Each group of recesses is disposed on an outer edge of the surface of one side of the base plate 2210, and an included angle between every two groups of recesses relative to a circle center of the base plate 2210 is 120°. For three recesses in each group, the three recesses are arranged in a wave shape, distances between two recesses close to the outer side and one recess in the middle are the same, the recess in the middle is closer to the outer edge of the base plate 2210 than the two recesses close to the outer side, and distances between the two recesses close to the outer side and the outer edge of the base plate 2210 are the same.

Figure 24:
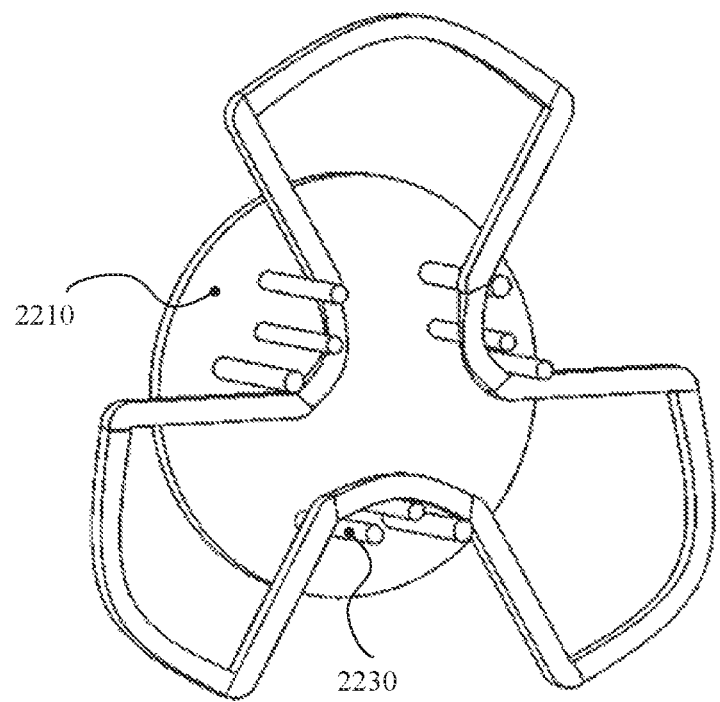
FIG. 24 is a schematic diagram of a structure of a cover plate according to an embodiment of this application.

Also, the cover plate 2220 is usually of a disk-shaped structure. A plurality of recesses are also disposed on a surface of one side of the cover plate 2220, and are configured to nest and fasten the plurality of stoppers 2230. For example, as shown in FIG. 24, nine recesses (not shown in the figure and at positions into which the stoppers 2230 are embedded) are disposed on a surface of one side of the cover plate 2220, and the nine recesses may be classified into three groups. Each group of recesses is disposed on an outer edge of the surface of one side of the cover plate 2220, and an included angle between every two groups of recesses relative to a circle center of the cover plate 2220 is 120°. For three recesses in each group, the three recesses are arranged in a wave shape, distances between two recesses close to the outer side and one recess in the middle are the same, the recess in the middle is farther from the outer edge of the cover plate 2220 than the two recesses close to the outer side, and distances between the two recesses close to the outer side and the outer edge of the cover plate 2220 are the same.

In a process in which the winding device 2200 presses a shape of a flux winding, the flux winding is first wrapped on the stoppers 2230 on a surface of one side of the base plate 2210, and all the stoppers 2230 are located inside the flux winding, as shown in FIG. 23. Then a part of the flux winding located between every two groups of stoppers 2230 is extruded in a circle center direction of the base plate 2210, and the cover plate 2220 is disposed at the circle center of the base plate 2210, so that the extruded part of the flux winding can be nested on the stopper 2230 on the cover plate 2220, and the extruded flux winding is located between the stopper 2230 on the cover plate 2220 and the circle center of the cover plate 2220. In this way, the stopper 2230 on the base plate 2210 and the stopper 2230 on the cover plate 2220 can bend the flux winding into a flux winding on a 6-pole 18-slot permanent magnet motor with an axial magnetic field. A composition structure of the flux winding finally pressed by the winding device 2200 is shown in FIG. 22.

In the winding device 2200 in the foregoing embodiment, only composition of a flux winding on a 6-pole 18-slot permanent magnet motor with an axial magnetic field is used as an example. A quantity of stoppers 2230 on the base plate 2210 and the cover plate 2220 may be further increased or reduced, so that a flux winding on another type of permanent magnet motor with an axial magnetic field can be formed. This is not limited herein in this application.

The winding device 2200 provided in this embodiment is more suitable for a flux winding with a round cross-section or a flux winding whose cross-sectional shape is not limited.

Figure 25:
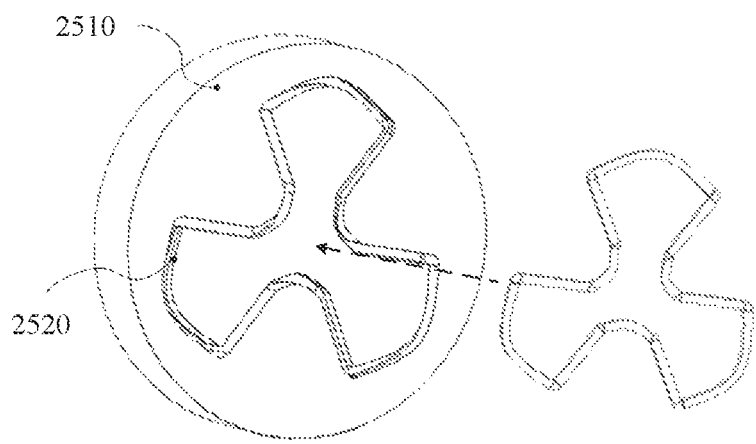
FIG. 25 is a schematic diagram of a structure of a winding device according to an embodiment of this application.

FIG. 25 shows a winding device 2500. The winding device 2500 includes a base plate 2510 and a limiting groove 2520. Structures of the two components are specifically as follows:

The base plate 2510 is usually of a disk-shaped structure, or may be of another structure. One limiting groove 2520 is disposed on a surface of one side of the base plate 2510, and is configured to nest a flux winding. For example, as shown in FIG. 25, the limiting groove 2520 is located at a center position of the base plate 2510, and is shaped to form a shape of a flux winding on a 6-pole 18-slot permanent magnet motor with an axial magnetic field.

Figure 26:
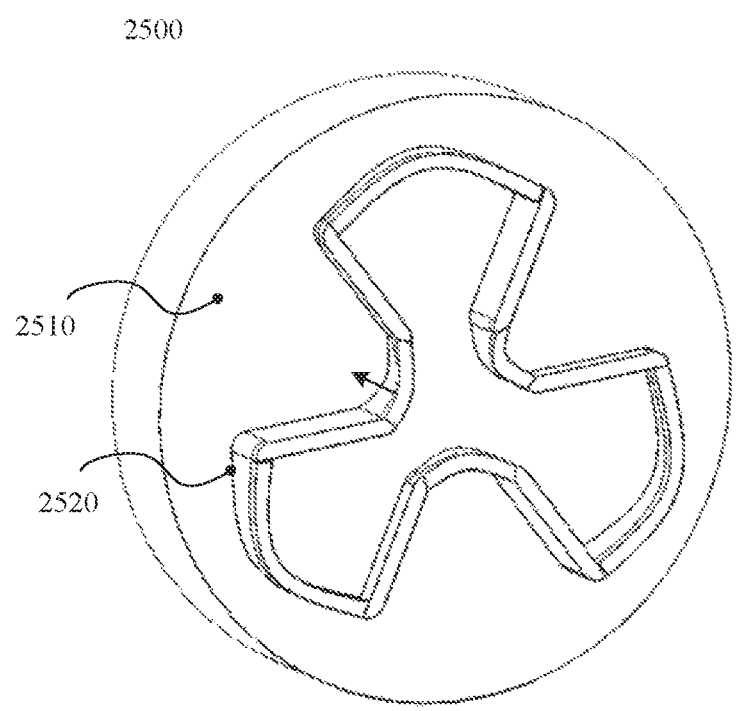
FIG. 26 is a schematic diagram of a winding device when the winding device presses a flux winding according to an embodiment of this application.

In a process in which the winding device 2500 presses a shape of a flux winding, the flux winding is first bent into a shape similar to that of the limiting groove 2520, and then the bent flux winding is gradually embedded into the limiting groove 2520 on the base plate 2510, to form the shape of the flux winding on the 6-pole 18-slot permanent magnet motor with the axial magnetic field. A composition structure of the flux winding finally pressed by the winding device 2500 is shown in FIG. 26.

In the winding device 2500 in the foregoing embodiment, only composition of a flux winding on a 6-pole 18-slot permanent magnet motor with an axial magnetic field is used as an example. A shape of the limiting groove 2520 may be further changed, so that the flux winding is embedded into the limiting groove 2520 to form a shape of a flux winding on another type of permanent magnet motor with an axial magnetic field. This is not limited herein in this application.

The winding device 2500 provided in this embodiment is more suitable for a flux winding with a flat cross-section or a flux winding with a regular shape such as a rectangle or a trapezoid.

An embodiment of this application further provides an electric vehicle, including at least one drive motor. The drive motor includes at least one motor stator described in FIG. 1 to FIG. 21 and corresponding content. Because the electric vehicle includes the motor stator, the electric vehicle has all or at least some of advantages of the motor stator.

In the descriptions of this specification, the specific features, structures, materials, or characteristics may be combined in a proper manner in any one or more of embodiments or examples.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A motor stator, comprising:
   a stator core, wherein an outer surface of the stator core is connected to an inner surface of the stator core through a plurality of stator slots of the stator core; and
   at least one flux winding, wherein:
   the flux winding is nested in the plurality of stator slots of the stator core, and is configured to generate an alternating flux when a current is applied;
   the flux winding comprises a plurality of first parts, a plurality of second parts, and a plurality of third parts, and the plurality of first parts and the plurality of third parts are alternately arranged in sequence, and are connected by using the plurality of second parts;
   the first part is a part that is of the flux winding and that is located on the outer surface of the stator core, the second part is a part that is of the flux winding and that is embedded into the stator slot, and the third part is a part that is of the flux winding and that is located on the inner surface of the stator core;
   each stator slot of the plurality of stator slots comprises a first surface that is close to an adjacent stator slot; and
   the motor stator comprises a plurality of permanent magnets, each permanent magnet of the plurality of permanent magnets is disposed on one of the plurality of first surfaces, and is configured to generate a permanent magnet flux, wherein a direction of the permanent magnet flux is perpendicular to a direction of an alternating flux generated by the flux winding.

2. The motor stator according to claim 1, wherein the stator core comprises a first end face and a second end face opposite to the first end face, and the plurality of stator slots are disposed on at least one of the first end face or the second end face.

3. The motor stator according to claim 1, wherein every two of the plurality of permanent magnets are spaced apart by a same quantity of stator slots.

4. The motor stator according to claim 1, wherein the direction of the permanent magnet flux is perpendicular to the first surface of the stator slot.

5. The motor stator according to claim 1, wherein a shape of the flux winding is a wave shape.

6. The motor stator according to claim 1, wherein a cross-sectional shape of the flux winding is a flat shape or a shape of a plurality of circles, and a slot opening of a stator slot is greater than a half of a slot width of the stator slot.

7. The motor stator according to claim 1, wherein a cross-sectional shape of the flux winding is a shape of a plurality of circles, and a slot opening of a stator slot is less than or equal to a half of a slot width of the stator slot.

8. The motor stator according to claim 2, wherein the plurality of stator slots are arranged on at least one of the first end face or the second end face at equal intervals.

9. The motor stator according to claim 2, wherein a second plurality of stator slots are disposed on each of the first end face and the second end face, and stator slots on the first end face and stator slots on the second end face are arranged in a paired mirror symmetric manner about a yoke part of the stator core.

10. The motor stator according to claim 2, wherein a second plurality of stator slots are disposed on each of the first end face and the second end face, one of two adjacent second parts of the flux winding is embedded into stator slots on the first end face, and the other one of the two adjacent second parts of the flux winding is embedded into stator slots on the second end face.

11. The motor stator according to claim 10, wherein one of the two adjacent second parts of the flux winding is embedded into a first stator slot on the first end face, the other one of the two adjacent second parts of the flux winding is embedded into a second stator slot on the second end face, and the first stator slot and the second stator slot are arranged in a mirror symmetric manner about a yoke part of the stator core.

12. The motor stator according to claim 1, wherein the flux winding comprises at least one turn of coil.

13. A drive motor, comprising one rotating shaft, at least one motor rotor, and at least one motor stator comprising:
a stator core, wherein an outer surface of the stator core is connected to an inner surface of the stator core through a plurality of stator slots of the stator core; and
at least one flux winding, wherein:
the flux winding is nested in the plurality of stator slots of the stator core, and is configured to generate an alternating flux when a current is applied;
the flux winding comprises a plurality of first parts, a plurality of second parts, and a plurality of third parts, and the plurality of first parts and the plurality of third parts are alternately arranged in sequence, and are connected by using the plurality of second parts; and
the first part is a part that is of the flux winding and that is located on the outer surface of the stator core, the second part is a part that is of the flux winding and that is embedded into the stator slot, and the third part is a part that is of the flux winding and that is located on the inner surface of the stator core;
wherein the at least one motor rotor and the at least one motor stator are alternately disposed, and are nested on the rotating shaft;
wherein each stator slot of the plurality of stator slots comprises a first surface that is close to an adjacent stator slot; and
wherein the motor stator comprises a plurality of permanent magnets, each permanent magnet of the plurality of permanent magnets is disposed on one of the plurality of first surfaces, and is configured to generate a permanent magnet flux, and a direction of the permanent magnet flux is perpendicular to a direction of an alternating flux generated by the flux winding.

14. The drive motor according to claim 13, wherein the stator core comprises a first end face and a second end face opposite to the first end face, and the plurality of stator slots are disposed on at least one of the first end face or the second end face.

15. The drive motor according to claim 13, wherein every two of the plurality of permanent magnets are spaced apart by a same quantity of stator slots.

16. An electric vehicle, comprising at least one drive motor, wherein the drive motor comprises one rotating shaft, at least one motor rotor, and at least one motor stator comprising:
a stator core, wherein an outer surface of the stator core is connected to an inner surface of the stator core through a plurality of stator slots of the stator core; and
at least one flux winding, wherein:
the flux winding is nested in the plurality of stator slots of the stator core, and is configured to generate an alternating flux when a current is applied;
the flux winding comprises a plurality of first parts, a plurality of second parts, and a plurality of third parts, and the plurality of first parts and the plurality of third parts are alternately arranged in sequence, and are connected by using the plurality of second parts; and
the first part is a part that is of the flux winding and that is located on the outer surface of the stator core, the second part is a part that is of the flux winding and that is embedded into the stator slot, and the third part is a part that is of the flux winding and that is located on the inner surface of the stator core;
wherein the at least one motor rotor and the at least one motor stator are alternately disposed, and are nested on the rotating shaft;
wherein each stator slot of the plurality of stator slots comprises a first surface that is close to an adjacent stator slot; and
wherein the motor stator comprises a plurality of permanent magnets, each permanent magnet of the plurality of permanent magnets is disposed on one of the plurality of first surfaces, and is configured to generate a permanent magnet flux, and a direction of the permanent magnet flux is perpendicular to a direction of an alternating flux generated by the flux winding.

17. The electric vehicle according to claim 16, wherein the stator core comprises a first end face and a second end face opposite to the first end face, and the plurality of stator slots are disposed on at least one of the first end face or the second end face.

18. The electric vehicle according to claim 16, wherein every two of the plurality of permanent magnets are spaced apart by a same quantity of stator slots.

19. The electric vehicle according to claim 16, wherein the direction of the permanent magnet flux is perpendicular to the first surface of the stator slot.

20. The electric vehicle according to claim 16, wherein a shape of the flux winding is a wave shape.

* * * * *